United States Patent
Xu et al.

(10) Patent No.: US 9,888,176 B2
(45) Date of Patent: Feb. 6, 2018

(54) VIDEO APPARATUS AND PHOTOGRAPHY METHOD THEREOF

(71) Applicant: ZTE CORPORATION, Shenzhen, Guangdong Province (CN)

(72) Inventors: Yuanyuan Xu, Shenzhen (CN); Chaoyang Yu, Shenzhen (CN); Yan Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/031,313

(22) PCT Filed: Jan. 28, 2014

(86) PCT No.: PCT/CN2014/071645
§ 371 (c)(1),
(2) Date: May 11, 2016

(87) PCT Pub. No.: WO2014/161386
PCT Pub. Date: Oct. 9, 2014

(65) Prior Publication Data
US 2016/0261796 A1     Sep. 8, 2016

(30) Foreign Application Priority Data
Oct. 22, 2013  (CN) .......................... 2013 1 0499734

(51) Int. Cl.
*H04N 5/232* (2006.01)
*H04N 5/91* (2006.01)
*H04N 1/21* (2006.01)
*H04N 7/18* (2006.01)

(52) U.S. Cl.
CPC ......... *H04N 5/23245* (2013.01); *H04N 1/212* (2013.01); *H04N 1/2125* (2013.01); *H04N 5/91* (2013.01); *H04N 7/18* (2013.01)

(58) Field of Classification Search
CPC .. H04N 5/23245; H04N 1/2133; H04N 1/212; H04N 1/2125; H04N 5/91; H04N 7/18
USPC .................................................. 386/225–227
See application file for complete search history.

(56) References Cited

U.S. PATENT DOCUMENTS

| 6,518,956 | B1 * | 2/2003 | Sato ................... H04N 5/23293 345/173 |
| 8,223,241 | B2 * | 7/2012 | Gayer .................... G03B 17/20 348/333.01 |
| 2008/0079817 | A1 | 4/2008 | Murata et al. |

(Continued)

FOREIGN PATENT DOCUMENTS

| CN | 101848325 A | 9/2010 |
| CN | 103220464 A | 7/2013 |
| CN | 103297755 A | 9/2013 |

(Continued)

*Primary Examiner* — Mishawn Hunter
(74) *Attorney, Agent, or Firm* — Ling Wu; Stephen Yang; Ling and Yang Intellectual Property

(57) ABSTRACT

Disclosed are a video recording apparatus and a photographing method thereof. The method includes: enabling a video recording mode when the video recording apparatus is powered on, and slowly playing a recorded video at a set speed during recording; and capturing a video image at a moment of triggering to obtain a photograph when a user triggers photographing.

12 Claims, 3 Drawing Sheets

(56) References Cited

U.S. PATENT DOCUMENTS

2009/0002478 A1* 1/2009 Ueki .................. H04N 1/00307
348/14.01
2011/0293244 A1  12/2011 Kuriyama

FOREIGN PATENT DOCUMENTS

| EP | 2141913 | A2 | 1/2010 |
|---|---|---|---|
| JP | 2011-205363 | * | 10/2011 |
| KR | 2011-0073697 | * | 6/2011 |

* cited by examiner

VIDEO APPARATUS AND PHOTOGRAPHY METHOD THEREOF

TECHNICAL FIELD

The present document relates to the field of electronic technology, in particular to a video recording apparatus and a photographing method thereof.

BACKGROUND OF THE RELATED ART

With the development of the electronic technology, more and more old people use portable electronic apparatus such as mobile phones with a photographing function. The old people love and cherish the life and thus expect to use the photographing function therein, such that they can take photographs as mementos in real time. However, with the increase of the ages of the old peoples, physiological characteristics such as comparatively slow response, hand trembling and eyesight aging will occur. These physiological characteristics cause inconvenience in the use of the photographing function, and photographs obtained after photographing are different from photographs that are actually wanted. However, the design of the current photographing function is not adjusted according to the photographing demands of the old people. Consequently, they often meet usage problems during photographing.

SUMMARY

The embodiment of the present document provides a video recording apparatus and a photographing method thereof, which are used for solving the problem that the photographing methods in the related arts cannot satisfy the use demands of aged users.

In one aspect, the embodiment of the present document provides a photographing method, which comprises:

enabling a video recording mode when a video recording apparatus is powered on, and slowly playing a recorded video at a set speed during recording; and capturing a video image at a moment of triggering to obtain a photograph when a user triggers photographing.

Alternatively, in the method provided by the embodiment of the present document, a current handheld state of the video recording apparatus is detected when the video recording apparatus is powered on, and the video recording mode is enabled when the handheld state satisfies a set photographing demand.

Alternatively, in the method provided by the embodiment of the present document, when the recorded video is played, the method further comprises: detecting the handheld state of the video recording apparatus in real time, deleting the current recorded video when the handheld state does not satisfy the set photographing demand, and recording a video again when the handheld state satisfies the set photographing demand.

Alternatively, in the method provided by the embodiment of the present document, when the user triggers photographing, the method further comprises: performing normal photographing by using the video recording apparatus to obtain a real-scene photograph at the moment of triggering, to allow the user to make a choice between the captured video image and the real-scene photograph.

Alternatively, the method provided by the embodiment of the present document further comprises:

after obtaining the photograph, detecting whether eyes of the user are focused on a screen of the video recording apparatus; if yes, using the captured video image as a final photograph; and if not, using the real-scene photograph as the final photograph.

Alternatively, in the method provided by the embodiment of the present document, the recorded video is used as a temporary file which is stored in the video recording apparatus; and after the photograph is obtained or when photographing exits, the stored temporary file is deleted.

In another aspect, the embodiment of the present document provides a video recording apparatus, which comprises:

a detection module configured to enable a video recording mode when detecting that the video recording apparatus is powered on; and a central processing module configured to control a display to slowly play a recorded video at a set speed during recording, and capture a video image at a moment of triggering to obtain a photograph when a user triggers photographing.

Alternatively, in the video recording apparatus provided by the embodiment of the present document, the detection module is further configured to detect a current handheld state of the video recording apparatus when detecting that the video recording apparatus is powered on, and enable the video recording mode when the handheld state satisfies a set photographing demand.

Alternatively, in the video recording apparatus provided by the embodiment of the present document, the central processing module is further configured to use the detection module to detect the handheld state of the video recording apparatus in real time when the recorded video is played, delete the current recorded video when the handheld state does not satisfy the set photographing demand, and record a video again when the detection module detects that the handheld state satisfies the set photographing demand.

Alternatively, in the video recording apparatus provided by the embodiment of the present document, the central processing module is further configured to perform normal photographing to obtain a real-scene photograph at the moment of triggering when the user triggers photographing, to allow the user to make a choice between the captured video image and the real-scene photograph.

Alternatively, in the video recording apparatus provided by the embodiment of the present document, the central processing module is further configured to, after obtaining the photograph, detect whether eyes of the user are focused on a screen of the video recording apparatus; if yes, use the captured video image as a final photograph; and if not, use the real-scene photograph as the final photograph.

Alternatively, the video recording apparatus provided by the embodiment of the present document further comprises:

a storage module configured to store the photograph and store the recorded video as a temporary file; and wherein the central processing module is further configured to, after the photograph is obtained or when photographing exits, delete the temporary file stored by the storage module.

The embodiment of the present document has the following beneficial effects:

The solution provided by the embodiment of the present document makes an improvement to a common photographing technique, the video recording mode is preferentially enabled during photographing, the recorded video is played in real time through a slow playing method, and since the playing speed is slow, the aged users can more easily capture images that are wanted, and the photographing use demands of the aged users are satisfied.

BRIEF DESCRIPTION OF DRAWINGS

The drawings which need to be used in the description of the embodiments or the related arts will be simply introduced below. The drawings described below are just some embodiments of the present document. The skilled in the art can obtain other drawings according to these drawings without contributing any inventive labor.

PREFERRED EMBODIMENTS

The technical solutions in the embodiments of the present document will be clearly and completely described below in combination with the drawings in the embodiments of the present document. Obviously, the embodiments to be described are just partial embodiments instead of all embodiments of the present document. All other embodiments obtained by one skilled in the art on the basis of the embodiments in the present document without contributing any inventive labor shall belong to the protection range of the present document. It should be illustrated that, under the situation of no conflict, the embodiments and the features in the embodiments in the present application can be freely combined.

In order to provide a photographing function design which satisfies the physiological characteristics of comparatively slow response, hand trembling and eyesight aging of old people and satisfy special photographing demands thereof, the embodiment of the present document provides a video recording apparatus and a photographing method thereof, herein the method makes an improvement to a common photographing technique on the basis of fully considering the physiological characteristics of aged users, and satisfies the photographing use demands of the aged users. The detailed implementation processes of the embodiments of the present document are described below through several embodiments.

Embodiment 1

Figure 1:
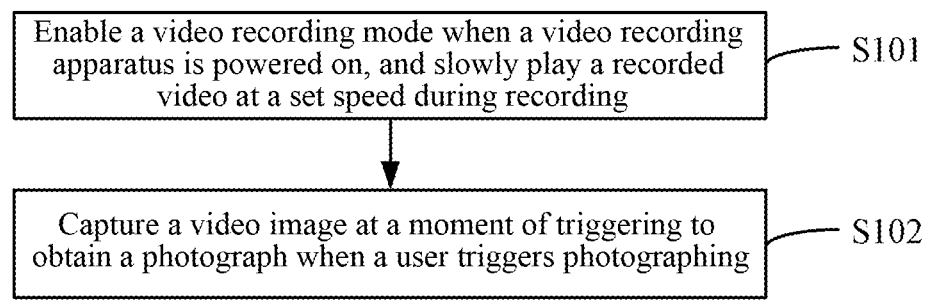
FIG. 1 is a flowchart of a photographing method provided by the embodiment of the present document.

The embodiment of the present document provides a photographing method. As shown in FIG. 1, the photographing method comprises:

In Step S101, it is to enable a video recording mode when a video recording apparatus is powered on, and slowly play a recorded video at a set speed during recording. In other words, the video recording apparatus plays the recorded video at a slow playing speed while recording the video.

More preferably, in this step, the playing speed can be flexibly set according to the demand and is not uniquely limited in this embodiment.

In Step S102, it is to capture a video image at a moment of triggering to obtain a photograph when a user triggers photographing.

More preferably, in the method provided by this embodiment, time of recording the video can be preset. After the recorded video is completely played, if the user does not perform photographing, the recorded video is deleted and recording of a next video is performed.

In other words, during photographing by using the method provided by this embodiment, the video recording mode is preferentially enabled, the recorded video is played in real time through a slow playing method, and since the playing speed is slow, the aged users can more easily capture images that are wanted and thus the use demands of the aged users can be more easily satisfied.

Based on the above-mentioned implementation principle, several preferred embodiments under the method are provided below, and they are used for optimizing the implementation process of the method provided by this embodiment of the present document, which involve the following contents:

Alternatively, in the method provided by this embodiment, before enabling the video recording mode, the handheld state of the video recording apparatus is preferentially detected; when the handheld state satisfies the set photographing demand, the video recording mode is enabled; otherwise, it is to enter a normal photographing preview mode. The set photographing demand usually refers to a position state of a camera when the user performs normal photographing. For example, during normal photographing, a plane position of the camera of the video recording apparatus is usually within an included angle range of −10 degrees to 10 degrees perpendicular to a ground. Only when it is detected that the handheld state satisfies the position requirement, an action is considered as a photographing action and video recording can be performed at this moment. Contrarily, when it is detected that the handheld state does not satisfy the position requirement, for example, the camera is in parallel with the ground, it is considered as that the user does not prepare to perform photographing and video recording may not be performed. In this way, the video recording apparatus can be prevented from doing great useless work and the energy saving effect is remarkable.

Alternatively, in the method provided by this embodiment, when the recorded video is played, the handheld state of the video recording apparatus is still detected in real time, the current recorded video is deleted when the handheld state does not satisfy the set photographing demand, and a video is recorded again when the handheld state satisfies the set photographing demand. In other words, this embodiment of the present document considers that the played scene is lagged because there is a time difference between the actually recorded scene and the played scene for a reason that the recorded video is played slowly. When the scene is changed, consequently the played scene is not a scene that is needed by the user. At this moment, if the user wants to exit the current played image, the user can adjust the handheld state of the video recording apparatus to not satisfy the set photographing demand. At this moment, the current played video will be deleted, the user can adjust the handheld state again to satisfy the photographing demand, thus the scene that is needed currently can be recorded and the recorded video can be played. Through this processing, the time display difference between a played segment and a real scene can be reduced to obtain a more accurate photographing effect.

Alternatively, in the method provided by this embodiment, when the user triggers photographing, the video recording apparatus is further used to perform normal photographing to obtain a real-scene photograph at the moment of triggering to allow the user to make a choice between the captured video image and the real-scene photograph.

Ways of making a choice between the captured video image and the real-scene photograph include but not limited to: after obtaining the photograph, detecting whether eyes of the user are focused on a screen of the video recording apparatus; if yes, using the captured video image as a final photograph; and if not, using the real-scene photograph as the final photograph.

Alternatively, in the method provided by this embodiment, the recorded video is used as a temporary file which is stored in the video recording apparatus. After the photograph is obtained or when photographing exits, the stored temporary file is deleted.

Figure 2:
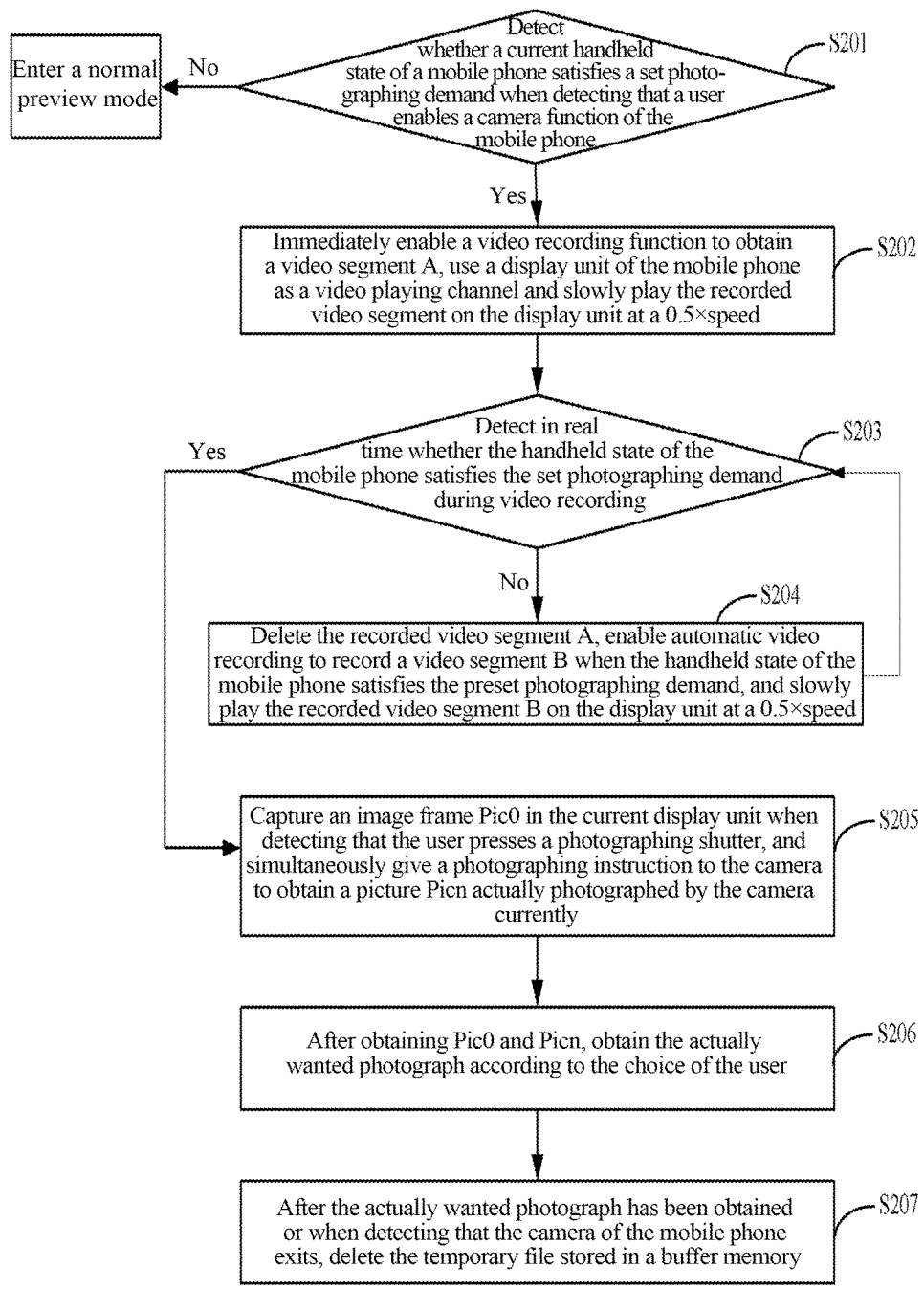
FIG. 2 is a flowchart of a photographing method described in an application example of the present document.

Based on the above-mentioned implementation process, a specific application example is provided below. The application example limits some specific implementation parameters and is used for more clearly describing this embodiment of the present document. In this application example, a mobile phone is used as the video recording apparatus. As shown in FIG. 2, a photographing process comprises:

In Step S201, it is to detect whether a current handheld state of a mobile phone satisfies a set photographing demand when detecting that a user enables a camera function of the mobile phone; if yes, it is to execute step S202; and if not, it is to enter a normal preview mode.

In Step S202, it is to immediately enable a video recording function to obtain a video segment A, use a display unit of the mobile phone as a video playing channel and slowly play the recorded video segment on the display unit at a 0.5×speed.

In Step S203, it is to detect in real time whether the handheld state of the mobile phone satisfies the set photographing demand during video recording; if yes, it is to continuously record and play the video and execute step S205; and if not, it is to execute step S204.

In Step S204, it is to delete the recorded video segment A, and enable automatic video recording to record a video segment B when the handheld state of the mobile phone satisfies the preset photographing demand, continuously use the display unit as the video playing channel, slowly play the recorded video segment B on the display unit at a 0.5× speed, and return to step S203.

In Step S205, it is to capture an image frame Pic0 in the current display unit when detecting that the user presses a photographing shutter, and simultaneously give a photographing instruction to the camera to obtain a picture Picn actually photographed by the camera currently.

In Step S206, after obtaining Pic0 and Picn, it is to use a human eye recognition eye-gaze tracking technique of a front camera to judge whether eyes of the user are focused on a screen or an area outside the screen during photographing; if it is judged that the eyes of the user are focused on the screen, then it is judged that a wanted image is captured while the user looks at the screen and thus the captured image frame Pic0 is reserved, and if it is judged that the eyes of the user are focused in the area outside the screen, then it is judged that the user sees a wanted image in a real world and thus the actually photographed picture Picn is reserved.

In Step S207, after the actually wanted photograph has been obtained or when detecting that the camera of the mobile phone exits, it is to delete the temporary file stored in a buffer memory, herein the temporary file refers to the recorded video information.

Embodiment 2

Figure 3:
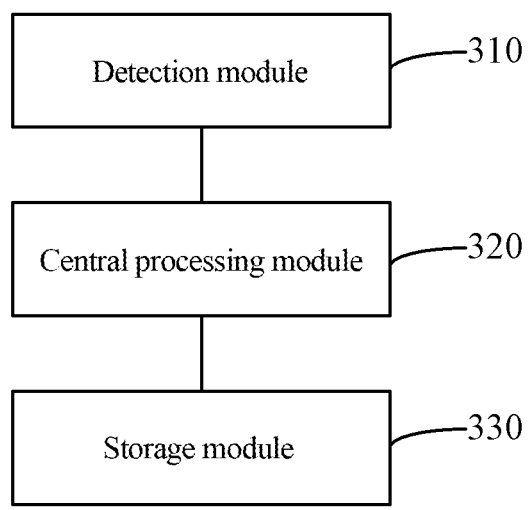
FIG. 3 is a structural diagram of a video recording apparatus provided by the embodiment of the present document.

Corresponding to embodiment 1, the embodiment of the present document further provides a video recording apparatus. As shown in FIG. 3, the video recording apparatus comprises:

a detection module 310 configured to enable a video recording mode when detecting the video recording apparatus is powered on; and a central processing module 320 configured to control a display to slowly play a recorded video at a set speed during recording, and capture a video image at a moment of triggering to obtain a photograph when a user triggers photographing.

In other words, during photographing by using the video recording apparatus provided by this embodiment, the video recording mode is preferentially enabled, the recorded video is played in real time through a slow playing method, and since the playing speed is slow, the aged users can more easily capture images that are wanted and thus the use demands of the aged users can be more easily satisfied.

Based on the above-mentioned implementation principle, several preferred embodiments under the structure are provided below, and they are used for optimizing the function of the video recording apparatus provided by this embodiment of the present document, which involve the following contents:

Alternatively, in this embodiment, the detection module 310 is further configured to detect a current handheld state of the video recording apparatus when detecting that the video recording apparatus is powered on, and enable the video recording mode when the handheld state satisfies a set photographing demand.

The set photographing demand usually refers to a position state of a camera when the user performs normal photographing. For example, during normal photographing, a plane position of the camera of the video recording apparatus is usually within an included angle range of −10 degrees to 10 degrees perpendicular to a ground. Only when it is detected that the handheld state satisfies the position requirement, an action is considered as a photographing action and video recording can be performed at this moment. Contrarily, when it is detected that the handheld state does not satisfy the position requirement, for example, the camera is in parallel with the ground, it is considered as that the user does not prepare to perform photographing and video recording may not be performed. In this way, the video recording apparatus can be prevented from doing great useless work and the energy saving effect is remarkable.

Alternatively, in this embodiment, the central processing module 320 is further configured to use the detection module to detect the handheld state of the video recording apparatus in real time when the recorded video is played, delete the current recorded video when the handheld state does not satisfy the set photographing demand, and record a video again when the detection module detects that the handheld state satisfies the set photographing demand.

In other words, this embodiment of the present document considers that the played scene is lagged because there is a time difference between the actually recorded scene and the played scene for a reason that the recorded video is played slowly. When the scene is changed, consequently the played scene is not a scene that is needed by the user. At this moment, if the user wants to exit the current played image, the user can adjust the handheld state of the video recording apparatus to not satisfy the set photographing demand. At this moment, the current played video will be deleted, the user can adjust the handheld state again to satisfy the photographing demand, thus the scene that is needed currently can be recorded and the recorded video can be played. Through this processing, the time display difference between a played segment and a real scene can be reduced to obtain a more accurate photographing effect.

Alternatively, in this embodiment, the central processing module 320 is further configured to perform normal photographing to obtain a real-scene photograph at the moment of triggering when the user triggers photographing, to allow the user to make a choice between the captured video image and the real-scene photograph.

Ways of making a choice between the captured video image and the real-scene photograph include but not limited to: after the central processing module 320 obtains the photograph, detecting whether eyes of the user are focused on a screen of the video recording apparatus; if yes, using the captured video image as a final photograph; and if not, using the real-scene photograph as the final photograph.

Alternatively, the video recording apparatus provided by this embodiment further comprises:

a storage module 330 configured to store the photograph and store the recorded video as a temporary file; and the central processing module 320 is further configured to, after the photograph is obtained or when photographing exits, delete the temporary file stored by the storage module.

Apparently, one skilled in the art should understand that all modules or steps of the present document can be implemented by using general computing devices, and can be integrated on a single computing device or be distributed on a network consisting of a plurality of computing devices. Alternatively, they can be implemented by using program codes that can be executed by the computing devices, such that they can be stored in storage devices and can be executed by the computing devices. In addition, under certain circumstances, the illustrated or described steps can be executed according to a sequence different from the sequence described above, or they are respectively manufactured into integrated circuit modules, or a plurality of modules or steps thereof are manufactured into a single integrated circuit module for implementation. Therefore, the present document is not limited to any specific hardware and software combination.

Apparently, one skilled in the art can made various modifications and variations to the present document without departing from the essence and the range of the present document. Therefore, if such modifications and variations to the present document fall into the range of the claims of the present document and the equivalent techniques thereof, the present document is also intended to cover such modifications and variations.

INDUSTRIAL APPLICABILITY

The solution provided by the embodiment of the present document makes an improvement to a common photographing technique, the video recording mode is preferentially enabled during photographing, the recorded video is played in real time through a slow playing method, and since the playing speed is slow, the aged users can more easily capture images that are wanted, and the photographing use demands of the aged users are satisfied.

What we claim is:

1. A photographing method, comprising:
    enabling a video recording mode when a video recording apparatus is powered on, and slowly playing a recorded video at a set speed during recording; and
    capturing a video image at a moment of triggering to obtain a photograph when a user triggers photographing;
    wherein a current handheld state of the video recording apparatus is detected when the video recording apparatus is powered on, and the video recording mode is enabled when the handheld state satisfies a set photographing demand;
    wherein when the recorded video is played, the method further comprises: detecting the handheld state of the video recording apparatus in real time, deleting the current recorded video when the handheld state does not satisfy the set photographing demand, and recording a video again when the handheld state satisfies the set photographing demand.

2. The method according to claim 1, wherein when the user triggers photographing, the method further comprises: performing normal photographing by using the video recording apparatus to obtain a real-scene photograph at the moment of triggering, to allow the user to make a choice between the captured video image and the real-scene photograph.

3. The method according to claim 2, further comprising:
    after obtaining the photograph, detecting whether eyes of the user are focused on a screen of the video recording apparatus; if yes, using the captured video image as a final photograph; and if not, using the real-scene photograph as the final photograph.

4. The method according to claim 3, wherein the recorded video is used as a temporary file which is stored in the video recording apparatus; and
    after the photograph is obtained or when photographing exits, the stored temporary file is deleted.

5. The method according to claim 2, wherein the recorded video is used as a temporary file which is stored in the video recording apparatus; and
    after the photograph is obtained or when photographing exits, the stored temporary file is deleted.

6. The method according to claim 1, wherein the recorded video is used as a temporary file which is stored in the video recording apparatus; and
    after the photograph is obtained or when photographing exits, the stored temporary file is deleted.

7. A video recording apparatus, comprising:
    a detection module configured to enable a video recording mode when detecting that the video recording apparatus is powered on; and
    a central processing module configured to control a display to slowly play a recorded video at a set speed during recording, and capture a video image at a moment of triggering to obtain a photograph when a user triggers photographing;
    wherein the detection module is further configured to detect a current handheld state of the video recording apparatus when detecting that the video recording apparatus is powered on, and enable the video recording mode when the handheld state satisfies a set photographing demand;
    wherein the central processing module is further configured to use the detection module to detect the handheld state of the video recording apparatus in real time when the recorded video is played, delete the current recorded video when the handheld state does not satisfy the set photographing demand, and record a video again when the detection module detects that the handheld state satisfies the set photographing demand.

8. The video recording apparatus according to claim 7, wherein the central processing module is further configured to perform normal photographing to obtain a real-scene photograph at the moment of triggering when the user triggers photographing, to allow the user to make a choice between the captured video image and the real-scene photograph.

9. The video recording apparatus according to claim 8, wherein the central processing module is further configured to, after obtaining the photograph, detect whether eyes of the user are focused on a screen of the video recording apparatus; if yes, use the captured video image as a final photograph; and if not, use the real-scene photograph as the final photograph.

10. The video recording apparatus according to claim 9, further comprising:
   a storage module configured to store the photograph and store the recorded video as a temporary file; and
   wherein the central processing module is further configured to, after the photograph is obtained or when photographing exits, delete the temporary file stored by the storage module.

11. The video recording apparatus according to claim 8, further comprising:
   a storage module configured to store the photograph and store the recorded video as a temporary file; and
   wherein the central processing module is further configured to, after the photograph is obtained or when photographing exits, delete the temporary file stored by the storage module.

12. The video recording apparatus according to claim 7, further comprising:
   a storage module configured to store the photograph and store the recorded video as a temporary file; and
   wherein the central processing module is further configured to, after the photograph is obtained or when photographing exits, delete the temporary file stored by the storage module.

* * * * *